(12) United States Patent
Bremer (10) Patent No.: US 7,345,587 B2
(45) Date of Patent: Mar. 18, 2008

(54) ELECTRONIC ARTICLE TRACKING SYSTEM FOR RETAIL RACK USING LOOP ANTENNA

(75) Inventor: Peter Bremer, Beerfelden-Olfen (DE)

(73) Assignee: Checkpoint Systems, Inc., Thorofare, NJ (US)

(*) Notice: Subject to any disclaimer, the term of this patent is extended or adjusted under 35 U.S.C. 154(b) by 143 days.

(21) Appl. No.: 11/114,398

(22) Filed: Apr. 26, 2005

(65) Prior Publication Data

US 2005/0242183 A1 Nov. 3, 2005

Related U.S. Application Data

(60) Provisional application No. 60/566,130, filed on Apr. 28, 2004.

(51) Int. Cl.
*G08B 13/14* (2006.01)
(52) U.S. Cl. .............................. 340/572.7; 340/572.8; 211/206
(58) Field of Classification Search ............ 340/572.1, 340/572.7, 572.8; 235/439
See application file for complete search history.

(56) References Cited

U.S. PATENT DOCUMENTS

| | | | |
|---|---|---|---|
| 1,670,973 A * | 5/1928 | May ............................ 211/38 |
| 3,752,960 A | 8/1973 | Walton |
| 3,816,708 A | 6/1974 | Walton |
| 4,223,830 A | 9/1980 | Walton |
| 4,580,041 A | 4/1986 | Walton |
| 4,846,356 A * | 7/1989 | Dubuc ........................ 211/106 |
| 5,061,941 A | 10/1991 | Lizzi et al. |
| 5,103,235 A * | 4/1992 | Clemens ..................... 343/742 |
| 5,347,263 A | 9/1994 | Carroll et al. |
| 5,373,301 A | 12/1994 | Bowers et al. |
| 5,430,441 A | 7/1995 | Bickley et al. |
| 5,446,447 A | 8/1995 | Carney et al. |
| 5,585,811 A | 12/1996 | Jetzer |
| 5,663,738 A | 9/1997 | Mueller |
| 5,744,791 A * | 4/1998 | Isaac et al. ............ 235/472.01 |
| 5,745,036 A | 4/1998 | Clare |
| 5,792,997 A | 8/1998 | Fukuzaki |
| 5,877,728 A | 3/1999 | Wu et al. |

(Continued)

FOREIGN PATENT DOCUMENTS

JP 2001-270608 A * 10/2001

OTHER PUBLICATIONS

International Search Report dated Aug. 1, 2005 for International Application No. PCT/US2005/013961.

*Primary Examiner*—Jeffery Hofsass
*Assistant Examiner*—Anne V. Lai
(74) *Attorney, Agent, or Firm*—Caesar, Rivise, Bernstein, Cohen & Pokotilow, Ltd.

(57) ABSTRACT

A fixture for use in a retail store is provided including a loop formed from a conductive material and adapted to support hanging articles, the loop having a first and second end, the first and second ends each connected to an insulator member, the first end being electrically insulated from the second end by the insulator member, and an RFID reader connected to each of the first end and the second end of the loop. A circuit is formed by the loop and the RFID reader, wherein the loop provides an antenna function for the RFID reader. A method of retrofitting a fixture for use in a retail store is also provided.

38 Claims, 7 Drawing Sheets

U.S. PATENT DOCUMENTS

| | | |
|---|---|---|
| 5,914,692 A | 6/1999 | Bowers et al. |
| 6,005,555 A | 12/1999 | Katsurahira et al. |
| 6,020,849 A | 2/2000 | Fukuzaki |
| 6,025,780 A | 2/2000 | Bowers et al. |
| 6,164,551 A | 12/2000 | Altwasser |
| 6,181,247 B1 | 1/2001 | Bremer et al. |
| 6,239,789 B1 | 5/2001 | Sekizawa et al. |
| 6,278,440 B1 | 8/2001 | Katsurahira et al. |
| 6,644,484 B1 * | 11/2003 | Sardis .................... 211/190 |
| 7,005,987 B2 * | 2/2006 | Sinnett et al. ........... 340/572.1 |
| 7,084,769 B2 * | 8/2006 | Bauer et al. ............. 340/572.7 |
| 2003/0174099 A1 | 9/2003 | Bauer et al. |
| 2004/0106376 A1 * | 6/2004 | Forster .................... 455/41.2 |
| 2005/0040934 A1 * | 2/2005 | Shanton ................... 340/5.92 |

* cited by examiner

ELECTRONIC ARTICLE TRACKING SYSTEM FOR RETAIL RACK USING LOOP ANTENNA

CROSS-REFERENCE TO RELATED APPLICATION

This utility patent application claims the benefit of U.S. Provisional Patent Application Ser. No. 60/566,130, filed Apr. 28, 2004, entitled Electronic Article Tracking System for Retail Rack Using Loop Antenna.

BACKGROUND OF THE INVENTION

The present invention is directed to electronic article security and tracking systems which use resonant security/tracking tags.

Electronic article security (EAS) systems for tracking as well as detecting and preventing theft or unauthorized removal of articles or goods from retail establishments and/or other facilities have become widespread. In general, such security systems employ a security tag which is secured to or associated with an article (or its packaging). Such an article is typically readily accessible to potential customers or facility users and, therefore, is susceptible to unauthorized removal. Security tags may take on many different sizes, shapes and forms depending upon the particular type of EAS system in use, the type and size of the article to be protected, the packaging for the article, etc. In general, such EAS systems are employed for detecting the presence (or the absence) of a security tag and, thus, a protected article within a surveilled security area or detection zone. With respect to use for preventing theft, in most cases, the detection zone is located at or around an exit or entrance to the facility or a portion of the facility.

With respect to tracking, for example, articles of clothing available for sale in a retail establishment, it may be desirable to track the physical location of such articles of clothing within the establishment. For example, it may be desirable to track when each individual article of clothing is removed from a fixture, such as a metal clothing rack, to obtain data to be used, for example, for manufacturing additional quantities of articles of clothing that receive the most customer attention based on data related to removal of such articles from the fixture.

However, the use of conventional radio frequency identification (RFID) technology to track articles of clothing in retail environments is difficult due, in part, to the display fixturing used for the clothing. Metal clothing racks or fixtures tend to interfere with antennas placed in walls or ceilings near clothing being displayed. Further, the movement of clothing on rolling racks or fixtures presents a challenge in the placement of antennae for article tracking. As the need increases to track garments within a retail space, rather than tracking garments just at store exits, placement of antennae is increasingly difficult.

One type of EAS system which has gained widespread popularity utilizes a security tag which includes a self-contained, passive resonant circuit in the form of a small, generally planar printed circuit which resonates at a predetermined detection frequency within a detection frequency range. A transmitter, which is also tuned to the detection frequency, is employed for transmitting electromagnetic energy into the detection zone. A receiver, tuned to the detection frequency, is positioned proximate to the detection zone. When an article having an attached security tag moves into or passes through the detection zone, the security tag is exposed to the transmitted energy, resulting in the resonant circuit of the tag resonating to provide an output signal detectable by the receiver. The detection of such an output signal by the receiver indicates the presence of an article with a security tag within the detection zone.

Recently, passive resonant security tags which return unique or semi-unique identification codes were developed. U.S. Pat. No. 5,446,447 (Carney et al.), U.S. Pat. No. 5,430,441 (Bickley et al.), and U.S. Pat. No. 5,347,263 (Carroll et al.) disclose three examples of such security tags. These security tags typically include an integrated circuit to generate the identification code. Such "intelligent" security tags provide additional information about the article detected in the zone of the interrogator.

It would be desirable to use such passive resonant security tags or even active resonant security tags which return unique or semi-unique identification codes in an article tracking system where there is minimal interference from metal clothing racks or fixtures and where antenna placement difficulties due to movement of rolling racks or fixtures are minimized.

All references cited herein are incorporated herein by reference in their entireties.

BRIEF SUMMARY OF THE INVENTION

A fixture for use in a retail store is provided which includes a loop formed from a conductive material and which is adapted to support hanging articles. The loop has a first and second end. The first and second ends of the loop are each connected to an insulator member where the first end is electrically insulated from the second end by the insulator member. An RFID reader is connected to each of the first end and the second end of the loop. A circuit is formed by the loop and the RFID reader wherein the loop provides an antenna function for the RFID reader.

The fixture may include a base and may include wheels. The fixture may be, for example, in the form of a vertical loop, a horizontal loop, may be adapted for suspension from a ceiling or may be mounted over a table. The circuit formed is preferably adapted to operate in the UHF or HF spectra.

Preferably, the RFID reader is operable from at least one rechargeable battery. The battery may be rechargeable by use of, for example, a standard AC outlet, solar cells, power generated by action from wheels attached to the fixture, or a proximity recharger. Preferably, the RFID reader includes a standby mode wherein full power is substantially reduced to conserve battery power except during scheduled intervals during which reading occurs or except during intervals when an operator or network makes a specific inquiry to the RFID reader. Preferably, the loop is constructed of metal, which may or may not be insulated, to accommodate long-term exposure or safety considerations. A plurality of loops may be included on the fixture that are operable to support articles, for example, by hangers. For example, the fixture may include at least two racks wherein the loops are parallel to one another or perpendicular to one another. A single RFID reader or multiple RFID readers may be used when multiple loops are used. The loops may or may not be isolated from one another when multiple loops are used. The loop may be adapted to create a far-field cancellation of antenna pattern. The loop may be crossed to create an intersection in the loop to create a far-field cancellation antenna pattern.

A method of retrofitting a fixture for use in a retail store is also provided which comprises the steps of providing at least one loop formed from a conductive material where the loop is adapted to support retail articles, opening a gap in the loop to yield a first end and a second end of the loop, inserting an insulating member in the gap, and electrically connecting an RFID reader between the first end and the second end of the loop to form a circuit including the loop and the RFID reader wherein the loop provides an antenna function for the RFID reader.

Preferably, the method includes the step of providing a base for the at least one loop. Wheels may be included on the base. The step of providing the loop may include providing a vertically oriented loop or a horizontally oriented loop, suspending the loop from a ceiling or mounting the loop over a table. The step of providing the loop may also include providing several loops for the fixture. For example, the two parallel or two perpendicular loops may be provided. The step of electrically connecting the RFID reader may include connecting one RFID reader to at least two of the plurality of loops. The loops may or may not be isolated from one another. The method may include the step of creating a far-field cancellation of antenna pattern. The method may also include the step of crossing the loop to create an intersection in the loop to create a far-field cancellation antenna pattern.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention is directed to electronic article security and tracking systems which use resonant security/tracking tags. Typically, clothing fixtures are made of metal and, therefore, with minimal modification can be retrofitted or be newly constructed to become "smart." For example, smart fixtures such as "smart racks," "smart rails" or "smart tables," as will be described herein, may be manufactured or existing fixtures of these types can be retrofitted. The fixtures or parts of the fixtures could become antennae for use in RFID that operate in the UHF (e.g. 915 MHz) and/or HF spectra (e.g. 13.56 MHz).

For the purpose of the present invention, the terms "rack" and "fixture" are intended to be synonymous and are intended to broadly include all types of racks, fixtures, or any other type of similar object used to support items sold at a retail store.

For example, a rolling rack for clothing on hangers can be modified to be a large detection loop antenna. To transform an existing rack into "smart" rack, a break in the loop must be created that can be attached to an RFID reader or interrogator. For purposes of the present invention, a "reader" is synonymous with an "interrogator." The reader provides RF energy to energize transponder tags on or in the clothing articles.

In the past, "smart shelves" have existed wherein a separate antenna is affixed to an architectural or furniture feature. By this invention, the physical function of the rack and the electrical function of antenna are achieved by the same object (i.e., the fixture).

Figure 1:
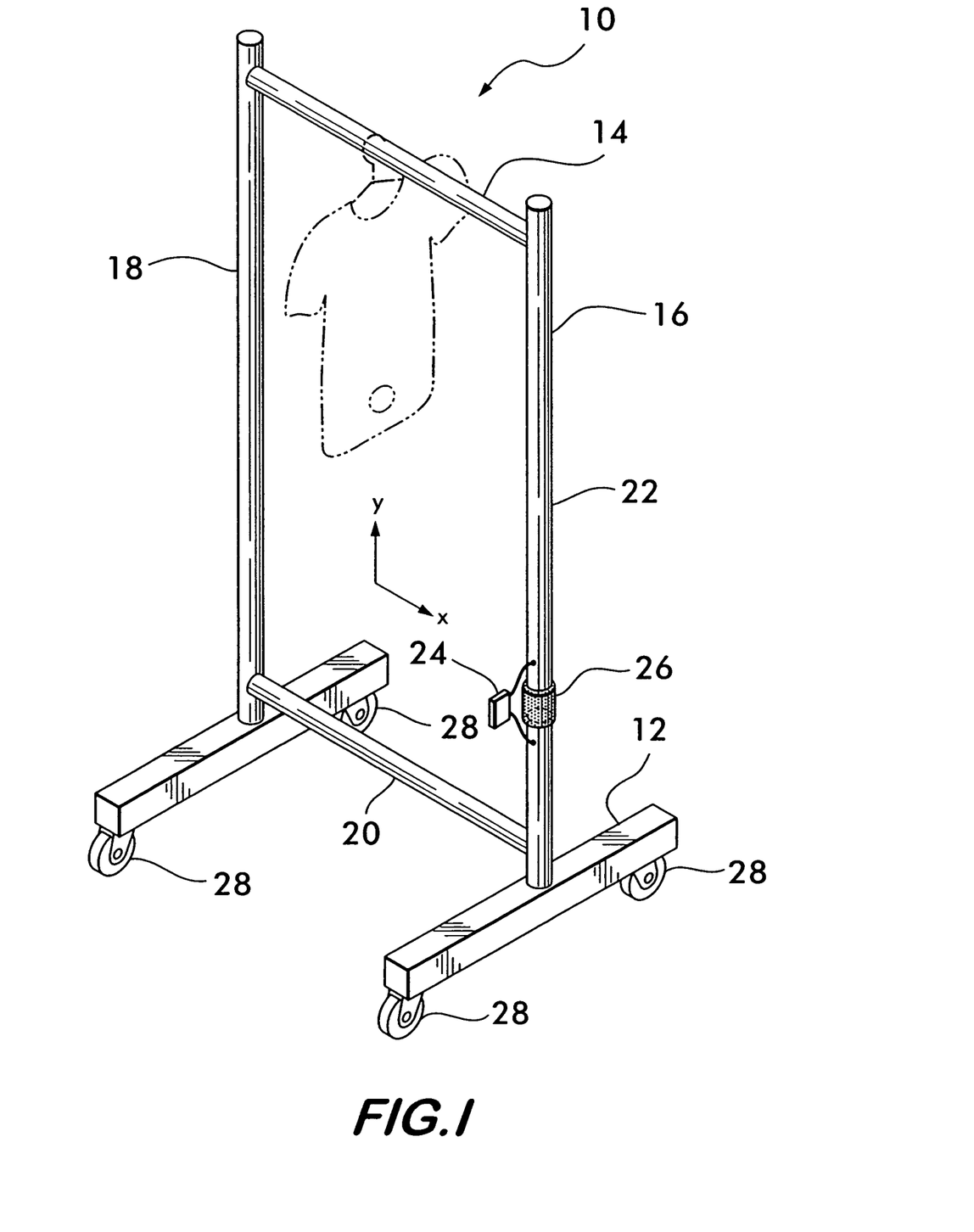
FIG. 1 is an isometric view of a fixture having a built-in loop antenna in accordance with one preferred embodiment of the present invention.

Referring now to the drawings wherein like part numbers refer to like elements throughout the several views, there is shown in FIG. 1 a fixture for use in a retail store 10 in accordance with one preferred embodiment of the present invention. The fixture 10 comprises a loop 22 which includes a base 12, a hanger bar 14, upright members 16, 18, and bottom support member 20. The hanger bar 14, upright members 16, 18 and bottom support member 20 form the loop 22 of conductive material that form an antenna, as will be further discussed below. The fixture 10, as shown in FIG. 1 is similar to a standard, prior art rolling rack with certain modifications such that loop 22 is formed into an antenna. The fixture 10 of FIG. 1 depicts a simple smart rack, where the rack is attached to an RFID reader (interrogator) 24 by the insertion of an insulated spacer 26.

Optionally, as shown, the base 12 of the rack 10 may have wheels 28 for assistance in movement of the rack 10 within a retail establishment.

Figure 2:
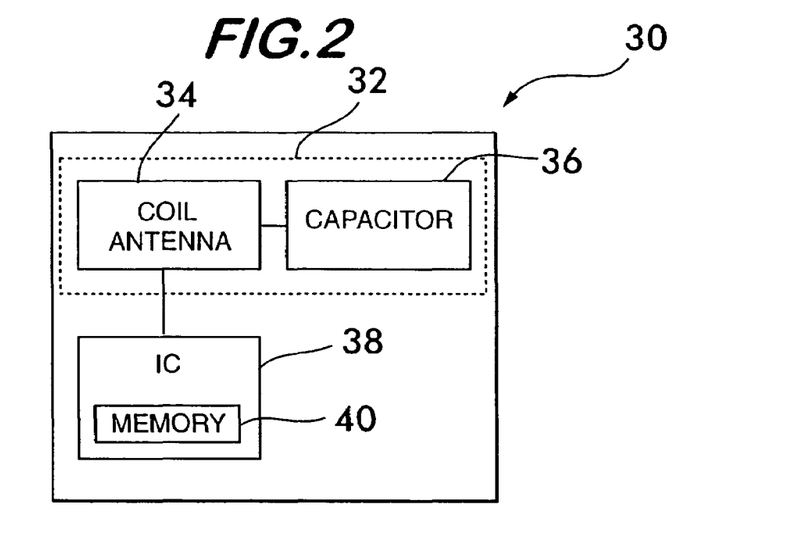
FIG. 2 is a block diagram schematic of an RFID tag suitable for use with the present invention.

FIG. 2 shows general details of a sample RFID tag 30 suitable for use with the present invention. The RFID tag 30 becomes an intelligent security tag when used in embodiments wherein the tag 30 is attached to articles. The tag 30 includes a passive resonant radio frequency (RF) circuit 32 for use in detecting when the tag 30 is within a zone monitored by a reader or interrogator, as is well-known in the art. One well-known type of circuit 32 has a coil antenna 34 and a capacitor 36 which together form a resonant circuit with a predetermined resonant frequency, i.e., the selected radio frequency determined by the values of the coil and the capacitor. Power for the tag 30 is derived from the antenna 34 in a conventional manner. Furthermore, the tag 30 includes an integrated circuit (IC) 38 for providing "intelligence" to the tag 30. The IC 38 is electrically connected to the resonant circuit 32. The capacitor 36 may be either external to the IC 38, or the capacitor 36 may be within the IC 38, depending upon the desired implementation of the circuit 32. The IC 38 includes a programmable memory 40, such as a twenty bit memory, for storing bits of identification data. The IC 38 outputs a data stream comprised of the stored data (e.g. twenty bits in the present embodiment) when sufficient power from the antenna 34 is applied thereto. In one embodiment of the invention, the data stream creates a series of data pulses by switching an extra capacitor (not shown) across the coil antenna 34 for the duration of the data pulses. The addition of the extra capacitor changes the resonant frequency of the RF circuit 32, detuning it from the operational frequency. Thus, instead of the RF circuit 32 returning a simple single frequency response signal, it returns a signal containing a packet of preprogrammed information. The packet of information (data pulses) is received and processed by interrogator receiving circuitry and is decoded (if necessary) to provide identification information about an article to which the tag 30 is secured. Other methods of using the data in the IC memory 40 to output identification data from the tag 30 are within the scope of the invention. The IC 38 is preferably also a passive device and is powered in the same manner as the RF circuit 32 (i.e., by using energy received at the antenna 34 from the interrogator transmitter signal). The tag 30 is thus a so-called "radio frequency identification (RFID) tag.". Other types of RFID tags may be used with the present invention such as RFID tags that use a tuned antenna (e.g., a dipole antenna) as an alternative to the RF circuit 32 where ultrahigh frequencies (UHF) are used, such as 915 MHz. Examples of other RFID tags which are suitable for use as the tag 30 are shown in U.S. Pat. No. 5,446,447 (Carney et al.), U.S. Pat. No. 5,430,441 (Bickley et al.), and U.S. Pat. No. 5,347,263 (Carroll et al.). Typically, RFID tags are not physically deactivatable. In other words, no physical change or change of magnetic state occurs to the state of the coil, capacitor or any other element comprising the antenna circuit of such RFID tags. An RFID tag which is not physically deactivatable has significant advantages over physically deactivatable magnetic security tags and/or prior art physically deactivatable RF security tags which are commonly used today because such RFID tags are more difficult to bypass. In some embodiments of the present invention, nonphysically deactivatable RFID tags are used. In other embodiments of the present invention, physically deactivatable RFID tags are used.

Figure 3:
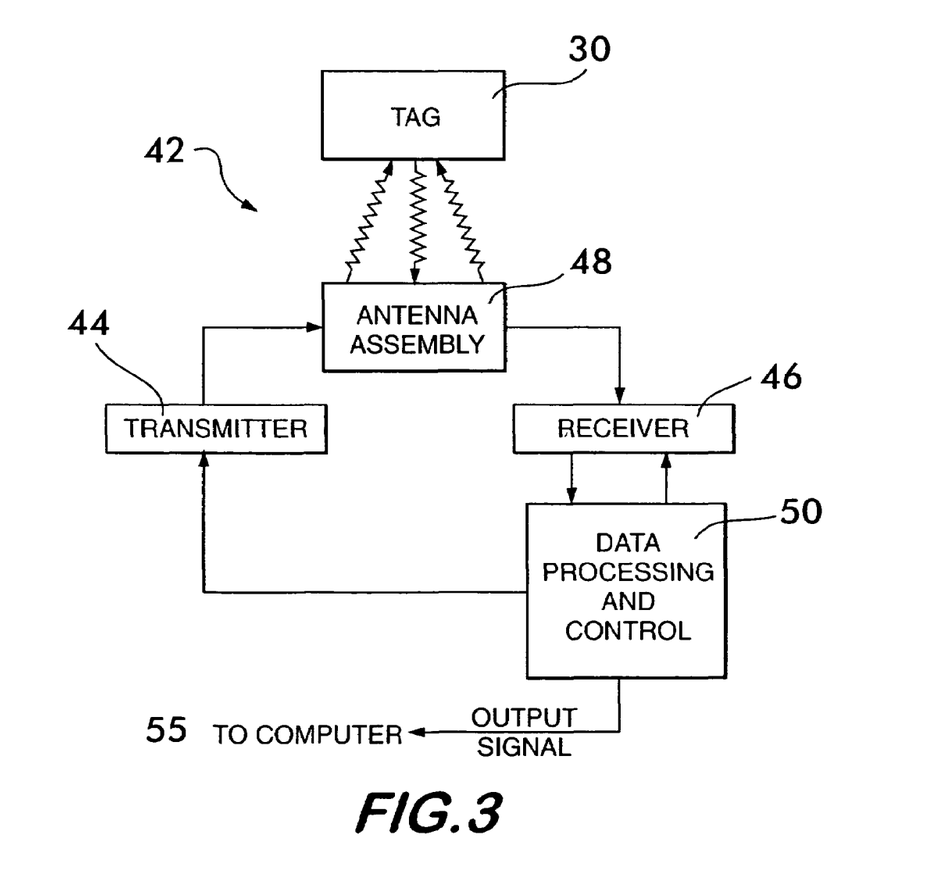
FIG. 3 is a functional block diagram schematic of a reader (i.e., an interrogator) suitable for use with the present invention.

FIG. 3 is a block diagram schematic of a reader or interrogator 42 suitable for use with the tag 30 described in FIG. 2. The interrogator 42 and the tag 30 communicate by inductive coupling, as is well-known in the art. The interrogator 42 includes a transmitter 44, receiver 46, antenna assembly 48, and data processing and control circuitry 50, each having inputs and outputs. The output of the transmitter 44 is connected to a first input of the receiver 46, and to the input of the antenna assembly 48. The output of the antenna assembly 48 is connected to a second input of the receiver 46. A first and a second output of the data processing and control circuitry 50 are connected to the input of the transmitter 44 and to a third input of the receiver 46, respectively. Furthermore, the output of the receiver 46 is connected to the input of the data processing and control circuitry (DPCC) 50. The DPCC 50 then transmits an output signal to a computer or database 55 where it is used to check states, locations, etc. It is within the broadest scope of the invention to have the DPCC 50 transmit the output signal wirelessly to a remote computer or database 55. Interrogators having this general configuration may be built using circuitry described in U.S. Pat. Nos. 3,752,960, 3,816,708, 4,223,830 and 4,580,041, all issued to Walton, all of which are incorporated by reference in their entirety herein. Alternatively, where UHF or microwave frequencies are used, the RFID reader may be implemented using a UHF/microwave reader, such as the SX2000 by WJ Communications, Inc. of San Jose, Calif.

Figure 4:
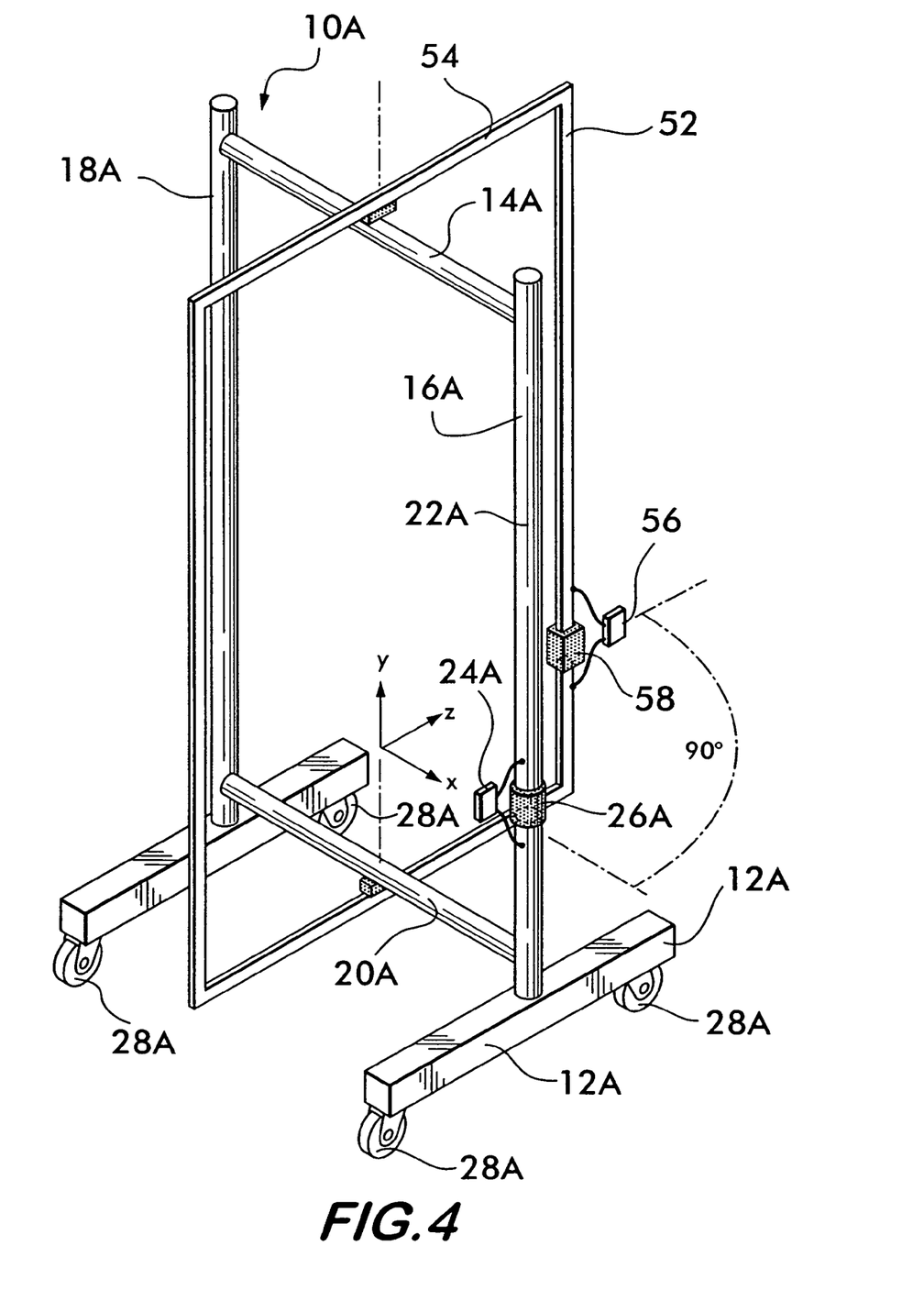
FIG. 4 is an isometric view of a fixture having a pair of built-in loop antennae in accordance with a second preferred embodiment of the present invention.

Fixtures such as racks have an advantage over flat shelves or pedestals in that multiple loops may be placed, for example, perpendicular to each other to achieve better coverage of tags distributed in random orientations. For example, as seen in FIG. 4, an additional embodiment of the present invention is shown that enhances of the fixture's operation by the addition of a second loop in the y, z plane. The fixture 10A of FIG. 4 includes a base 12A, a hanger bar 14A, upright members 16A and 18A, bottom support member 20A, loop 22A, RFID reader 24A, insulated spacer 26A and wheels 28A. Additionally, a second loop 52 is shown that is mounted to the hanger bar 14A and bottom support member 20A. This second loop 52 provides for clothing to be hung in on the primary hanger bar 14A and the second loop hanger bar 54. Again, as in the loop 22A, loop 52 includes an RFID reader 56 and insulated spacer 58 similar to the reader 24A and spacer 26A of loop 22A. For clarity of illustration, this loop 52 is depicted in the center of the span of the hanger bar 14A. As shown, FIG. 4 depicts two RFID readers. However, a single RFID reader may be multiplexed between loops. It is noted that direct, unmultiplexed connection of an RFID reader to two or more loops is inferior in practice. The two loops 22A, 52 of FIG. 4 are depicted as being completely isolated (see insulators 53A and 53B), but this need not be the case. Sharing of a single node is permissible.

Figure 5:
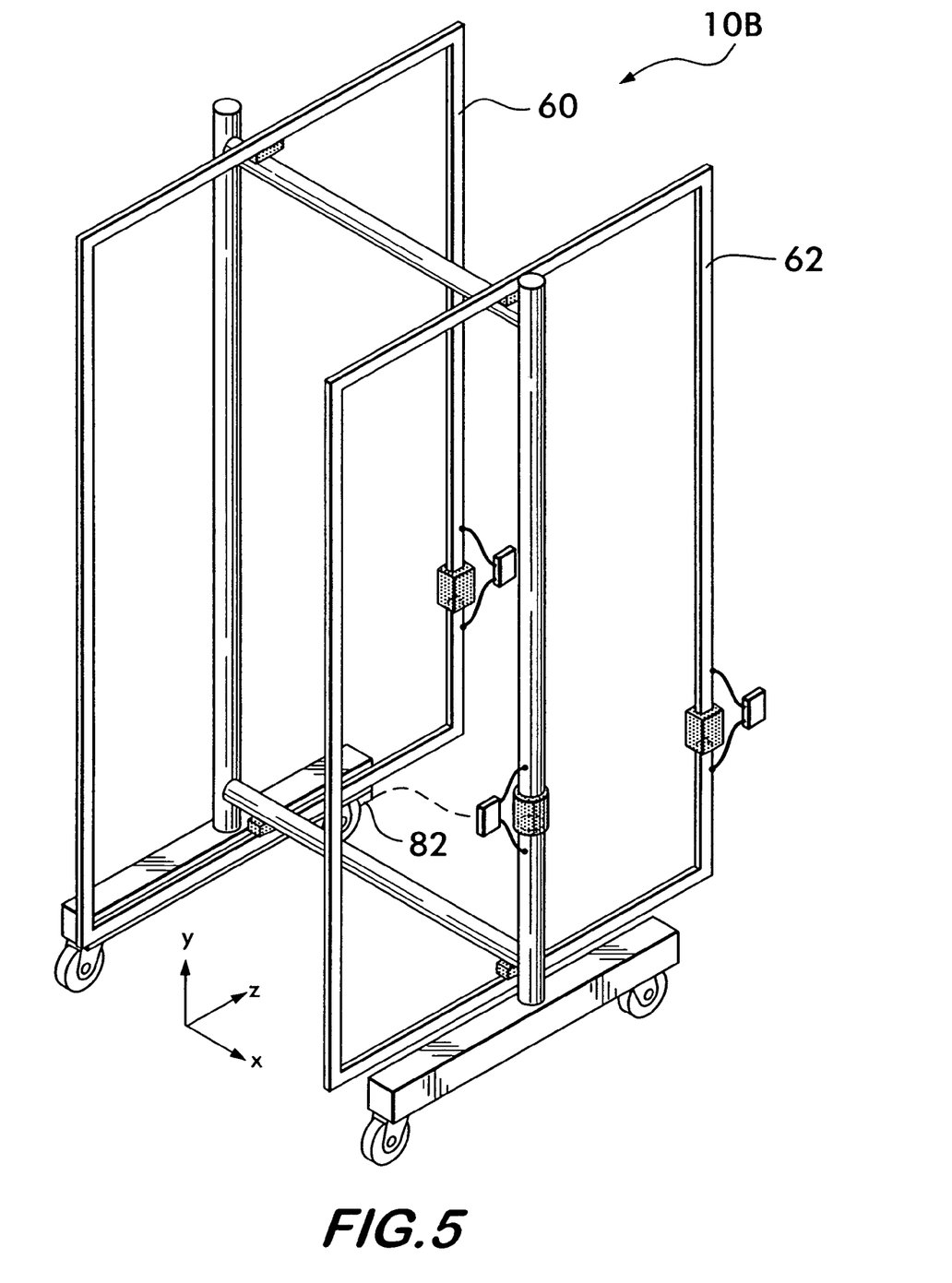
FIG. 5 is an isometric view of a fixture having three built-in loop antennae in accordance with a third preferred embodiment of the present invention.
Figures 6, 7:
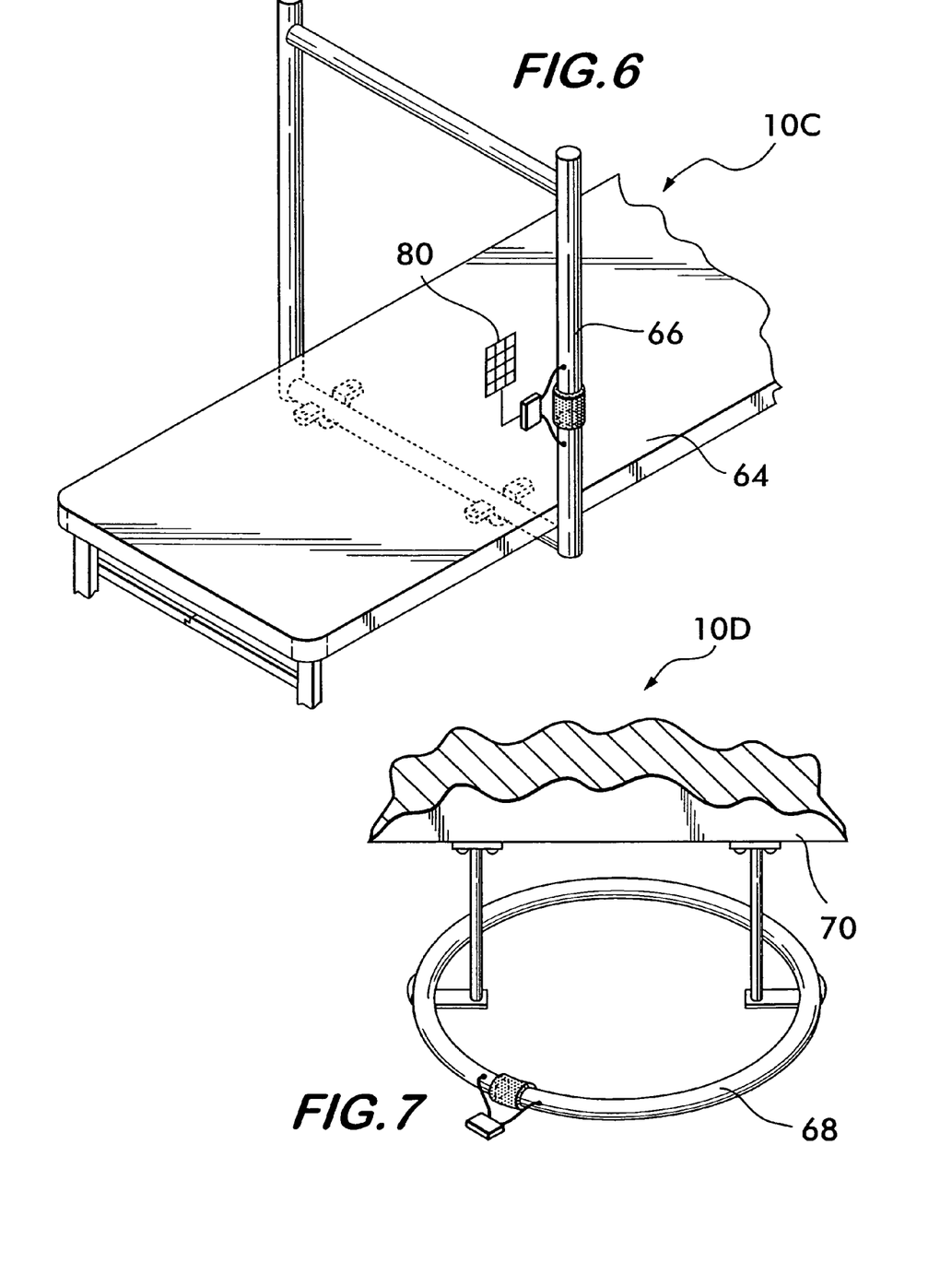
FIG. 6 is an isometric view of a fixture having a built-in loop antenna in accordance with a fourth preferred embodiment of the present invention.
FIG. 7 is an isometric view of a fixture having a built-in loop antenna in accordance with a fifth preferred embodiment of the present invention.
Figures 8, 9:
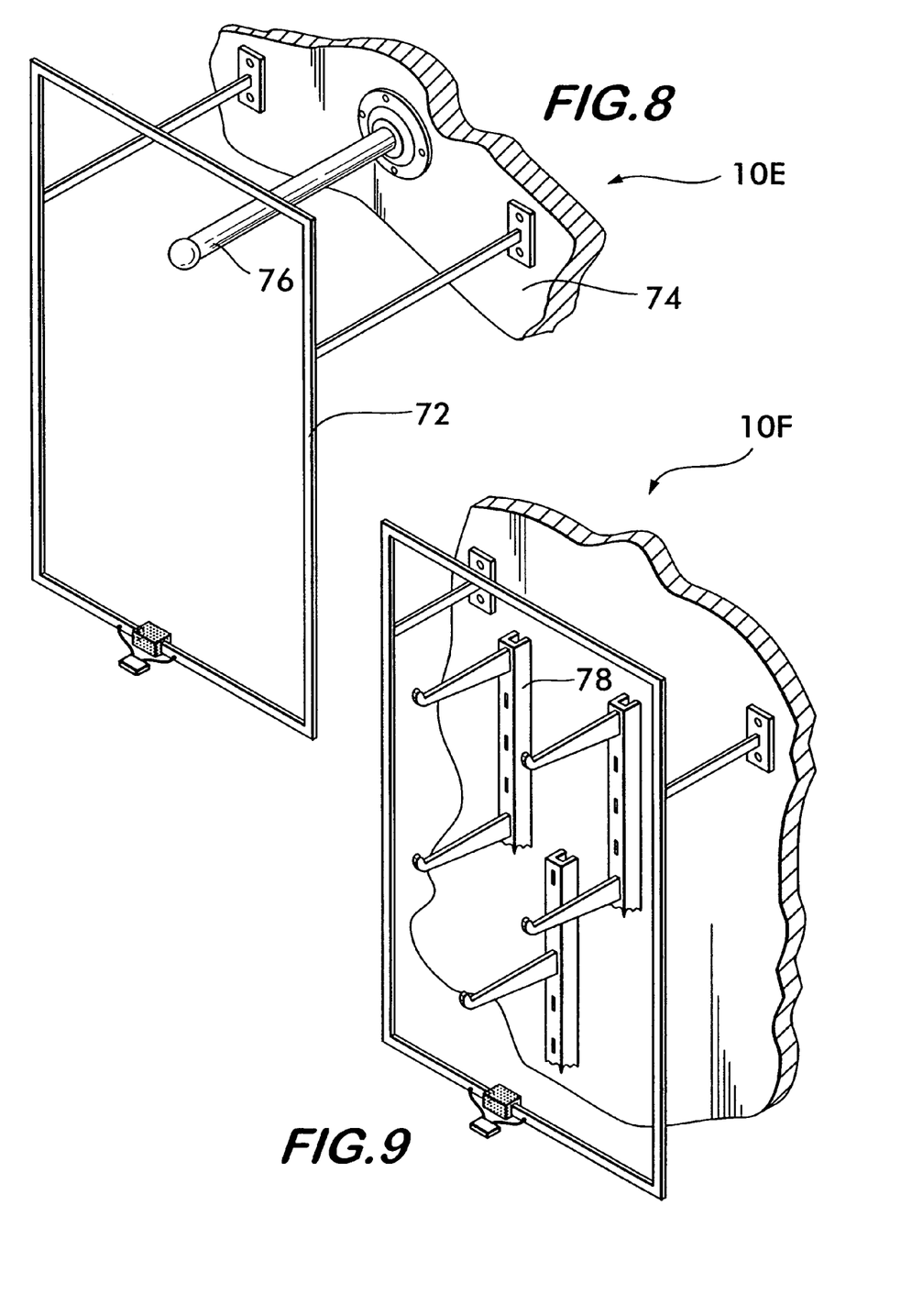
FIG. 8 is an isometric view of a fixture having a built-in loop antenna in accordance with a sixth preferred embodiment of the present invention.
FIG. 9 is an isometric view of a fixture having a built-in loop antenna in accordance with a seventh preferred embodiment of the present invention.

Examples of other embodiments of the present invention are shown, for example, in the fixtures 10B, 10C, 10D, 10E and 10F of FIGS. FIGS. 5-9, respectively. The specific details of these particular embodiments are not fully described, but suffice it to say that the basic elements are of a substantially identical configuration to that of FIGS. 1 and 4. As shown in FIG. 5, a fixture 10B is provided having loops 60, 62 at each end of the fixture 10B, or three loops with one at each end and another at the center of the rack (not shown). As shown in FIG. 6, a fixture 10C is provided that is designed for hanging garments over a table top 64. Here, loop 66 is shown where the elements of the loop are mounted to the table top (here, shown in an optional under-the-table top configuration. As shown in FIG. 7, a fixture 10D is provided where the loop 68 for hanging garments is mounted to a ceiling 70. As shown in FIG. 8, a fixtures 10E is provided where the loop 72 for hanging garments is mounted to a wall 74. Clothing may be hung on the structure forming the loop 72 itself or on the hanger bar 76. Similarly, as shown in FIG. 9, a fixture 10F is provided where garments again may be either hung on the structure of the loop itself or on a hook system 78. These latter two systems do not have the advantage of portability.

Figure 10:
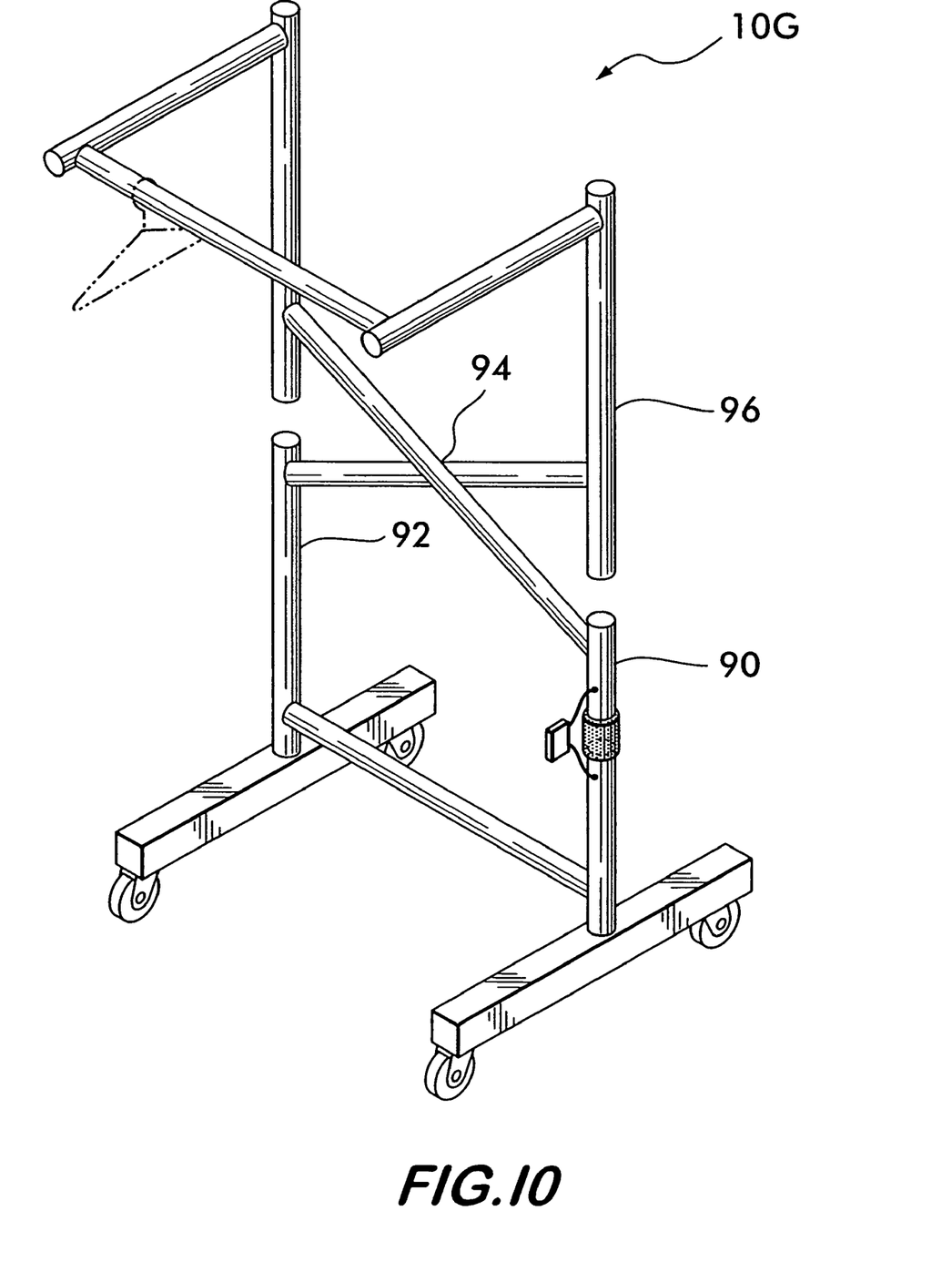
FIG. 10 is an isometric view of a fixture having a built-in loop antenna in accordance with an eighth preferred embodiment of the present invention.

Another alternate embodiment of the present invention is shown in fixture 10G of FIG. 10. Fixture 10G is similar to that of FIG. 1 except that it is in generally a "FIG. 8" configuration, i.e., a paired loop configuration, having, effectively, two loops, rather than a single loop. With each set of paired leads, one lead forms an "active" antenna loop. The other lead forms a "passive" loop, i.e., one which is not driven or driving, but interacts with the respective loop only through mutual coupling between them.

As can bee seen in FIG. 10, the upright members 90, 92 extend upwardly, then cross at intersection 94. This crossing over of the loop 96 is what creates far-field cancellation of the antenna patterns, as well as reduces interference from remote sources of extraneous radio frequency energy. This technique of crossing over is well known as shown, for example, in U.S. Pat. No. 5,103,235 (Clemens), the complete specification of which is fully incorporated by reference hereto.

It is intended that the scope of the present fixturing invention include providing the ability to hang clothing as well as a variety of other retail merchandise not necessarily specified herein.

Further embodiments of the system of the present invention include the use of fixtures having RFID readers that are battery powered and recharged by a standard power cord, and/or, for example, with solar cells 80 (FIG. 6), power generation from wheel action 82, or proximity rechargers similar to those used for electronic toothbrushes (not shown). These charging systems may be integrated into the RFID reader and are well known in the art of battery powered systems.

Low average power consumption can be achieved via low duty factor, with reading occurring, for example, only at scheduled intervals or in response to operator or network inquiries.

Synchronization issues with other readers can be achieved via wireless slaving, timed interleave for non-interference, or protocol extensions to accommodate inter-reader communication via the tag communication channel.

The rack material (including, for example, hanger bar 14, upright members 16, 18 and bottom support member 20 of FIG. 1 and similar elements in the other embodiments shown herein) may be left as bare metal or coated with insulation to accommodate any long term exposure or safety considerations.

The precise dimensions of the various loops described in the various embodiments and the amount of power required for each of these loops may vary considerably. However, such dimensions and requirements regarding power are well within the knowledge of one skilled in the art of antenna design.

While the invention has been described in detail and with reference to specific embodiments thereof, it will be apparent to one skilled in the art that various changes and modifications can be made therein without departing from the spirit and scope thereof.

What is claimed is:

1. A fixture for use in a retail store, comprising:
   (A) a loop formed from a conductive material and adapted to support hanging articles on hangers, said loop having a first and second end, and a horizontal hanger bar therebetween to support the hangers, said first and second ends each connected to an insulator member, said first end being electrically insulated from said second end by the insulator member;
   (B) an RFID reader connected to each of the first end and the second end of the loop, said RFID reader is operable from at least one rechargeable battery; and
   (C) a base having a plurality of wheels;
   whereby a circuit is formed by the loop and the RFID reader, wherein the loop provides an antenna function for the RFID reader.

2. The fixture of claim 1, wherein the fixture forms a vertical loop.

3. The fixture of claim 1, wherein the fixture forms a horizontal loop.

4. The fixture of claim 1, wherein the fixture forms a loop in the form of a adapted for suspension from a ceiling.

5. The fixture of claim 1, wherein the loop is mounted over a table.

6. The fixture of claim 1, wherein the circuit formed is adapted to operate in the UHF spectrum.

7. The fixture of claim 1, wherein the circuit formed is adapted to operate in the HF spectrum.

8. The fixture of claim 1, wherein the rechargeable battery is rechargeable by connection to a standard AC outlet.

9. The fixture of claim 1, wherein the rechargeable battery is rechargeable by connection to a solar cells.

10. The fixture of claim 1, wherein the rechargeable battery is rechargeable by power generated from wheel action from wheels attached to the fixture.

11. The fixture of claim 1, wherein the rechargeable battery is rechargeable by connection to a proximity recharger.

12. The fixture of claim 1, wherein the RFID reader includes a standby mode wherein full power is substantially reduced to conserve battery power except during scheduled intervals during which reading occurs.

13. The fixture of claim 1, wherein the RFID reader is in a standby mode wherein full power is substantially reduced to conserve battery power except during intervals when an operator or network makes a specific inquiry to the RFID reader.

14. The fixture of claim 1, wherein the loop is constructed of metal.

15. The fixture of claim 1, wherein the loop is coated with insulation to accommodate long-term exposure or safety considerations.

16. The fixture of claim 1, comprising a plurality of loops.

17. The fixture of claim 16, wherein one RFID reader is used for at least two of the plurality of loops.

18. The fixture of claim 16, wherein the plurality of loops are isolated from one another.

19. The fixture of claim 16, wherein at least two of the loops are isolated from one another.

20. The fixture of claim 16, wherein the plurality of loops are not isolated from one another.

21. The fixture of claim 1, comprising at least two loops wherein the loops are parallel to one another.

22. The fixture of claim 1, comprising two loops, wherein the loops are perpendicular to one another.

23. A fixture for use in a retail store, comprising:
   (A) a loop formed from a conductive material and adapted to support hanging articles on hangers, said loop having a first and second end and a horizontal hanger bar therebetween to support the hangers, said first and second ends each connected to an insulator member, said first end being electrically insulated from said second end by the insulator member said loop being adapted to create a far-field cancellation of antenna pattern; and
   (B) an RFID reader connected to each of the first end and the second end of the loop;
   whereby a circuit is formed by the loop and the RFID reader, wherein the loop provides an antenna function for the RFID reader.

24. A fixture for use in a retail store, comprising:
   (A) a loop formed from a conductive material and adapted to support hanging articles on hangers, said loop having a first and second end and a horizontal hanger bar therebetween to support the hangers, said first and second ends each connected to an insulator member, said first end being electrically insulated from said second end by the insulator member, wherein the loop is crossed to create an intersection in the loop to create a far-field cancellation antenna pattern; and
   (B) an RFID reader connected to each of the first end and the second end of the loop;
   whereby a circuit is formed by the loop and the RFID reader, wherein the loop provides an antenna function for the RFID reader.

25. A method of retrofitting a fixture for use in a retail store, comprising the steps of:
- (A) providing at least one loop formed from a conductive material, the loop adapted to support retail articles, said loop having a horizontal hanger bar to support said articles on hangers;
- (B) opening a gap in the loop to yield a first end and a second end of the loop;
- (C) inserting an insulating member in the gap to provide structural support for the loop;
- (D) electrically connecting an RFID reader between the first end and the second end of the loop to form a circuit by the loop and the RFID reader wherein the loop provides an antenna function for the RFID reader; and
- (E) creating a far-field cancellation of antenna pattern.

26. The method of claim 25, including the step of providing a base for the at least one loop.

27. The method of claim 26, wherein the step of providing the base includes providing a plurality of wheels on the base.

28. The method of claim 25, wherein the step of providing the at least one loop includes providing a vertically oriented loop.

29. The method of claim 25, wherein the step of providing the at least one loop includes providing a horizontally oriented loop.

30. The method of claim 25, wherein the step of providing the at least one loop includes the step of suspending the loop from a ceiling.

31. The method of claim 25, wherein the step of providing the at least one loop includes step of mounting the loop over a table.

32. The method of claim 25, wherein the step of providing at least one loop includes providing a plurality of loops.

33. The method of claim 32, including the step of isolating the loops from one another.

34. The method of claim 32, wherein the loops are not isolated from one another.

35. The method of claim 25, wherein the step of providing the at least one loop includes providing at least two loops wherein the loops are parallel to one another.

36. The method of claim 25, wherein the step of providing the at least one loop includes providing two loops, wherein the two loops are perpendicular to one another.

37. The method of claim 25, wherein the step of electrically connecting the RFID reader includes connecting one RFID reader to at least two of the plurality of loops.

38. A method of retrofitting a fixture for use in a retail store, comprising the steps of:
- (A) providing at least one loop formed from a conductive material, the loop adapted to support retail articles, the loop having a horizontal hanger bar to support said articles on hangers;
- (B) opening a gap in the loop to yield a first end and a second end of the loop;
- (C) inserting an insulating member in the gap to provide structural support for the loop; and
- (D) electrically connecting an RFID reader between the first end and the second end of the loop to form a circuit by the loop and the RFID reader wherein the loop provides an antenna function for the RFID reader; and
- (E) crossing the loop to create an intersection in the loop to create a far-field cancellation antenna pattern.

* * * * *